United States Patent [19]

Proctor et al.

[11] Patent Number: 5,109,378
[45] Date of Patent: Apr. 28, 1992

[54] ASYNCHRONOUS TIME DIVISION SWITH WITH INCREASED TRAFFIC HANDLING CAPABILITY

[75] Inventors: Richard J. Proctor; Thomas S. Maddern; Alexander S. Philip, all of Wimborne, United Kingdom

[73] Assignee: Gec Plessey Telecommunications Limited, England

[21] Appl. No.: 420,763

[22] Filed: Oct. 12, 1989

[30] Foreign Application Priority Data

Oct. 25, 1988 [GB] United Kingdom ............... 8824972

[51] Int. Cl.$^5$ ............................................. H04J 3/02
[52] U.S. Cl. .................................. 370/58.1; 370/65.5; 370/60
[58] Field of Search ............. 370/60, 58.1, 94.1, 370/65.5

[56] References Cited

U.S. PATENT DOCUMENTS

| | | | |
|---|---|---|---|
| 4,651,318 | 3/1987 | Luderer | 370/60 |
| 4,737,951 | 4/1988 | Krüger et al. | 370/58.1 |
| 4,811,333 | 3/1989 | Rees | 370/58.1 |
| 4,864,558 | 9/1989 | Imagawa et al. | 370/60 |
| 4,879,712 | 11/1989 | Littlewood | 370/60 |
| 4,955,016 | 9/1990 | Eng et al. | 370/60 |
| 4,965,788 | 10/1990 | Newman | 370/60 |

OTHER PUBLICATIONS

"Fast Packet Switching for Broadband ISDN", by P. Newman, University of Cambridge, UK.

Primary Examiner—Douglas W. Olms
Assistant Examiner—Min Jung
Attorney, Agent, or Firm—Kirschstein, Ottinger, Israel & Schiffmiller

[57] ABSTRACT

An asynchronous time division (ATD) switch for carrying out packet switching. In one embodiment a switch has 256 ports running at 155 M bits and is capable of switching incoming data cells at each of the input ports to any one of 256 output ports. At each input port a switch sequentially distributes the received data cells over 16 outputs each of which is connected to a different DMR circuit. There are 256 DMR circuits each having 16 inputs and 16 outputs. A DMR circuit is a fixed space switching device which has N inputs, N time intervals and N outputs and operates cyclically so that each input goes to each output for 1/Nth of the time. The inner stage of the ATD switch comprises 256 central switches each having 16 inputs and 16 outputs. Each central stage switch has its 16 inputs connected to 16 different DMR circuits. The fourth stage of the switch consists of another array of 256 output DMR circuits with each central switch being connected to 16 different output DMR circuits. Each input DMR has its outputs connected to 16 different output ports. The internal circuitry of the ATD switch runs on 20 M bits. When a data cell is received at an input port its destination is derived from a header attached to the cell. Control circuitry enables the receiving port to request three addresses to query three possible routes through the switch. The ability to provide this series of questions is given by staggering the windows through which an output port can communicate with the central switches. Although data streams are received asynchronously the operation of the ATD switch is synchronous.

7 Claims, 6 Drawing Sheets

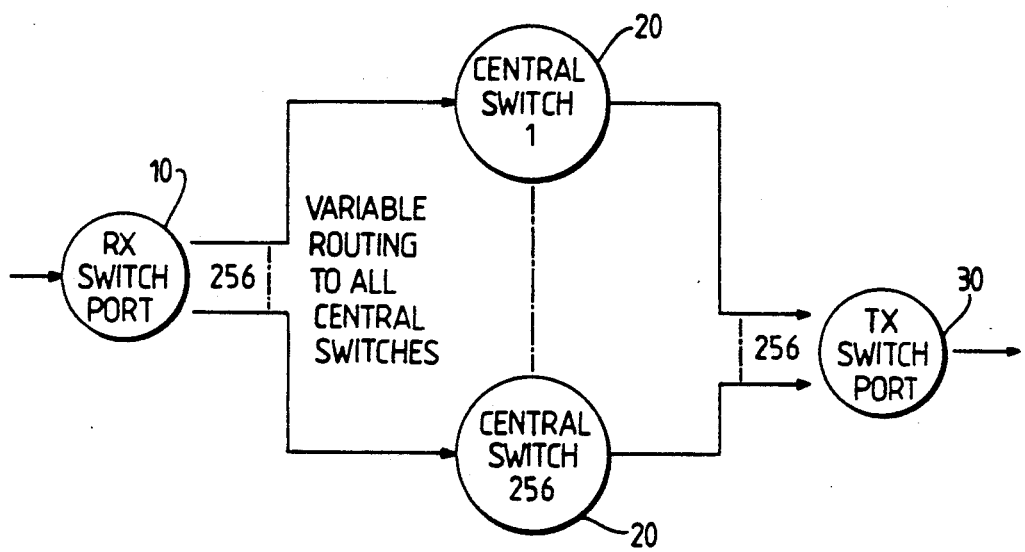
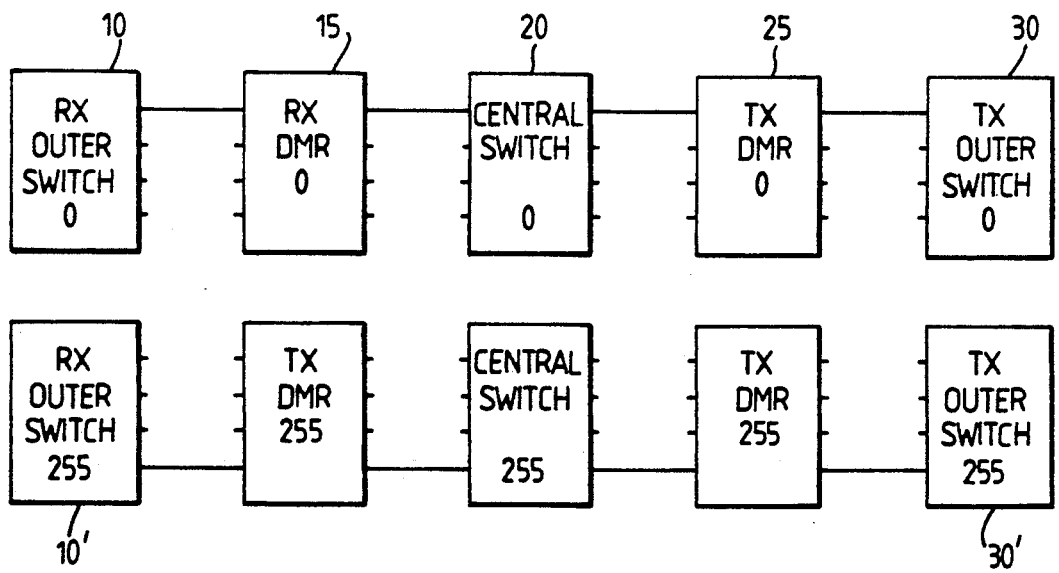

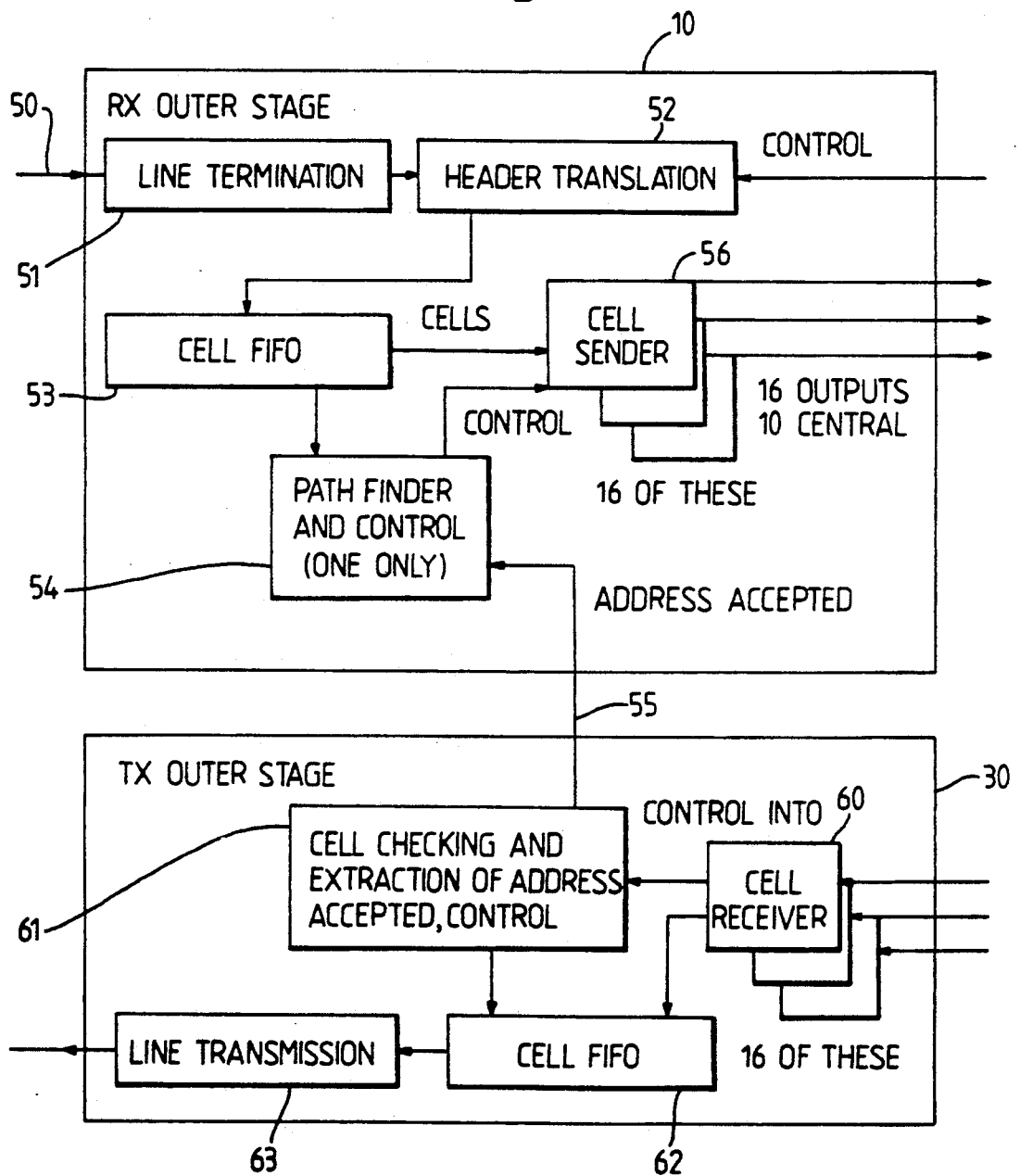

Fig.4.

| | | | |
|---|---|---|---|
| OUTPUT 0 | WINDOW 0 | WINDOW 16 | |
| OUTPUT 1 | WINDOW 1 | WINDOW 17 | |
| OUTPUT 2 | WINDOW 2 | WINDOW 18 | |
| OUTPUT 3 | 243 | WINDOW 3 | WINDOW 19 |
| OUTPUT 4 | 244 | WINDOW 4 | WINDOW 20 |
| OUTPUT 5 | 245 | WINDOW 5 | WINDOW 21 |
| OUTPUT 6 | WINDOW 246 | WINDOW 6 | WINDOW 22 |
| OUTPUT 7 | WINDOW 247 | WINDOW 7 | WINDOW 23 |
| OUTPUT 8 | WINDOW 248 | WINDOW 8 | WINDOW 24 |
| OUTPUT 9 | WINDOW 249 | WINDOW 9 | WINDOW 25 |
| OUTPUT 10 | WINDOW 250 | WINDOW 10 | 26 |
| OUTPUT 11 | WINDOW 251 | WINDOW 11 | 27 |
| OUTPUT 12 | WINDOW 252 | WINDOW 12 | 28 |
| OUTPUT 13 | WINDOW 253 | WINDOW 13 | 29 |
| OUTPUT 14 | WINDOW 254 | WINDOW 14 | 30 |
| OUTPUT 15 | WINDOW 255 | WINDOW 15 | |

Fig.5.

| RX TO CENTRAL | AD1 | AV | AD2 | AD3 | SPARE | CELL TO CENTRAL |
|---|---|---|---|---|---|---|
| FIELD WIDTHS | 8 | 2 | 8 | 8 | 6 | 288 |

← 20 BITS → ↳ START OF NEXT WINDOW

320 BIT WINDOW

CENTRAL TO TX: THIS NEED NOT BE TOTALLY ALIGNED WITH THE RX SIDE

| | A1 | A2 | A3 | CELL FROM CENTRAL |
|---|---|---|---|---|
| FIELD WIDTHS | 1 | 1 | 1 | 288 |

AD1 = REQUESTED ADDRESS 1   A1 = ACCEPTED ADDRESS 1
AD2 = REQUESTED ADDRESS 2   A2 = ACCEPTED ADDRESS 2
AD3 = REQUESTED ADDRESS 3   A3 = ACCEPTED ADDRESS 3
AV  = ADDRESSES VALID (0,1,2,3)

ASYNCHRONOUS TIME DIVISION SWITH WITH INCREASED TRAFFIC HANDLING CAPABILITY

BACKGROUND OF THE INVENTION

1. Field of the Invention

The present invention concerns what are known as Asynchronous Time Division Switches. Such switches will hereinafter be referred to as ATD switches.

2. Description of Related Art

ATD switches are used in digital data transmission systems to receive multiplexed data streams and to distribute the incoming data streams to requisite output ports.

SUMMARY OF THE INVENTION

The present invention is particularly, but not exclusively concerned with ATD switches for carrying out packet switching. In a packet switching system each incoming data stream consists of a sequence of what are known as cells, each cell for example consisting of 32 bytes of data and a header containing control data from which the destination of the cell can be determined. Typically for a 32 byte cell the headers will be 4 bytes long. However, neither the cell nor the header length are of fundamental importance to the operation of ATD switches.

As the rate of data transmission and the volume of digital traffic to be handled by digital transmission systems is continually increasing the problems of switching data streams becomes increasingly complex.

The present invention is concerned with providing an ATD switch which is capable of handling a substantial number of input data streams and yet which uses currently available technology.

Accordingly from one aspect the present invention consists in an asynchronous time division (ATD) switch for handling a plurality of asynchronous serial data streams having sequential data cells, the ATD switch comprising a plurality of input ports each capable of receiving a data stream, and a plurality of output ports each capable of transmitting a data stream, and wherein the ATD switch includes a central stage providing a multiplicity of paths by means of which each data cell received can reach its required output port, the central stage providing both synchronous switching between the input and output ports and a fixed delay for any of the possible paths by which a given input cell can pass through the ATD switch from an input port to an output port.

From a second aspect the invention consists in an ATD switch for handling a plurality of asynchronous serial data streams having sequential data cells at a first frequency, the ATD switch comprising a plurality of input ports each capable of receiving a data stream and distributing the cells of that stream over N outputs, where N is an integer, each output being connected to an individual DMR circuit as hereinafter defined, the DMR circuits having N inputs and N outputs each output of each DMR circuit being connected to one of a plurality of central stage switches in such a manner that each input port has access to all central stage switches over a switch cycle period defined by the cycle time of the DMR circuits, and wherein the central switches are connected to a plurality of output ports.

Basically DMR stands for Demultiplex - Mix - Remultiplex and a DMR circuit is a fixed space switching device which has N inputs, N time intervals and N outputs and operates cyclically so that each input goes to each output for 1/Nth of the time. As the DMR stages have a simple space switching function for serial streams they do not add any delay to the switching time.

Preferably there are the same number of input ports, DMR circuits, central switches and output ports.

According to another feature of the invention each central switch has N outputs each connected to an individual one of a set of output DMR circuits similar to the input DMR circuits, each output DMR circuit having one of its N outputs connected to an output port with each output port having N inputs.

In accordance with a still further feature of the invention the rate of data transmission within the ATD switch is slower than that of the incoming and outgoing data streams.

BRIEF DESCRIPTION OF THE DRAWINGS

In order that the present invention may be more readily understood an embodiment will now be described by way of example and with reference to the accompanying drawings, in which:

FIG. 1 is a schematic diagram of an embodiment of an ATD switch according to the present invention, FIG. 2 is a block diagram showing a very simplified ATD switch according to the present invention, FIG. 3 is a block diagram of the receive and transmit outer stages of the switch, FIG. 4 is a timing diagram showing timing sequences in the operation of the ATD switch, FIG. 5 is a timing diagram showing how routing data within the switch can be derived.

DETAILED DESCRIPTION OF THE PREFERRED EMBODIMENTS

Figure 6:
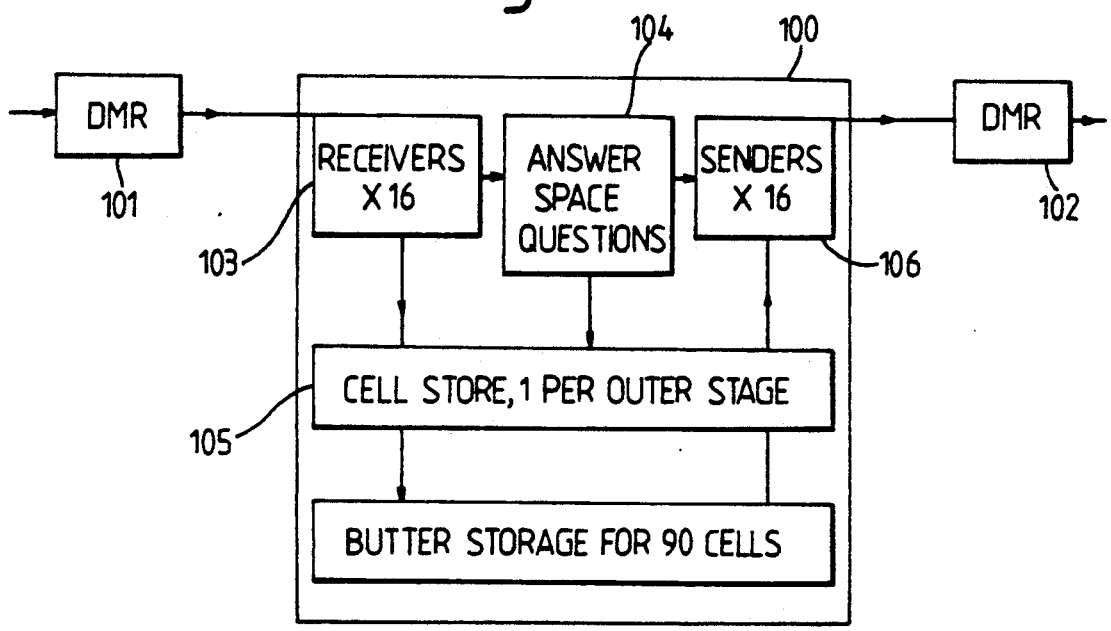
FIG. 6 is a block diagram of a control stage.

Referring now to FIG. 1 of the drawings this shows a single input port and associated switch 10 of an ATD switch constructed in accordance with the present invention. The switch 10 is connectable to a set of central switches 20 in turn connectable to an output switch 30. The input port and its associated switch 10 is part of a set of similar input ports and switches. Each input port receives a data stream which consists of a sequence of multi-byte cells, each cell having a header from which the destination of the cell can be derived. When a cell and its header is received by an input port the switch associated with that port distributes the cells sequentially over a number of outputs. Each output of each switch 10 is connected to what will hereinafter be referred to as a DMR circuit as defined above. These circuits are not shown in this figure.

Referring to FIG. 2 of the drawings, each of the input DMR circuits in turn has its N outputs connected to an equivalent number of different central switches 20 which forms the central stage of the ATD switch. Each central switch has the same number of inputs as each outer switch and DMR circuit has outputs. It also has the same number of outputs each of which is connected to a DMR circuit similar to the input DMR circuits. In fact the complete ATD switch is effectively symmetrical about the central stage 20 as the output DMR circuits are each in turn connected to N output switches and associated ports.

In the format being described there are equal numbers of input switches, input DMR circuits, central switches, output DMR circuits and output switches. Thus in a symmetrical ATD of the kind being described there will be X input switches, X central switches, 2X DMR circuits and X output switches with X being an integer multiple of N.

The result of this symmetrical arrangement is that each input switch 10 has access to all of the central switches 20 for a period or window depending on the internal parameters of the complete ATD switch. Furthermore for any cell arriving at an input port there are a possible X routes across the switch to its intended output port.

In the present embodiment there are 256 input ports and 256 output ports with $N=16$. The incoming data streams are at 155 M-bits and the internal circuitry of the switch is such that the DMR stages and central switches run at the slower rate of 20M bits per second. As the DMR stages have a 16 unit cycle this gives an internal frame cycle of 16 so that over every 16 internal frame cycles each of the 256 input ports 10 is connected to each of the 256 central switches for a period sufficient for it to pass a single cell of an incoming data stream. Each cell is 32 bytes long and has an associated header 4 bytes long.

The central switches 20 each have 16 outputs which are connected to 16 individual DMR output circuits. These output DMR circuits are identical in structure and operation to the input DMR circuits and each DMR output circuit is connected to 16 output ports 30. Thus any cell in any data stream input at an input port has a possibility of 256 routes to its possible destination. Also there are no problems of sequencing the cells as they will always arrive at the output side of the ATD switch in the same order as they arrived at the input side. This sequencing is one result of the constant central stage delay for a cell transmitted across the switch and is an important factor.

In the embodiment being described the basic incoming cell size of 288 bits (32+4 octets) is extended up to 320 bits to give a 32 bit control capability to enable the central switching stage to handle the routing of individual cells.

Referring now to FIG. 2 of the drawings this block diagram shows in slightly greater detail the arrangement of outer input stage formed from input switches, input DMR circuit, central switching stage, output DMR circuit and output stage formed from output switches. In this Figure the first outer input port, numbered 0, is shown at 10 and the last input stage, numbered 255, is shown at 10'. Only one output line 11 is shown for each input stage but there are in fact, as already described, 16 outputs per input stage with each output going to a different DMR. The 256 DMR circuits 15 are thus each connected to 16 of the input stages and have 16 outputs each connected to different central switches 20. Each central switch has 16 inputs and 16 outputs and each of its outputs is connected to a different output DMR circuit 25, with the DMR circuits 25 each being in turn connected to 16 output stages 30.

FIG. 3 of the drawing shows an outer input stage 10 and an output stage 30 in greater detail.

An input data stream consisting of sequential data cells each having an associated header is received at 50 with a suitable line termination 51. The received signal is passed to a header translation circuit 52 which under the control of a suitable processor translates the cell headers so that their destinations can be determined.

The timing of the cell frames is arranged so that they are staggered both on output of the input stage and on receipt at the central stage. This is done so as to ensure that each outer stage switch has the undivided attention of a central stage for a period of time or window. The switches use their windows to determine the capability of the central stage to hold and then transmit a cell to a given output port. This staggering can best be appreciated from the timing diagram shown in FIG. 4 of the drawings. This figure shows the sixteen outputs of a single outer stage switch of the kind shown in FIG. 3. As described in operation the input data stream is distributed cell by cell over 16 outputs each connected to a DMR stage. These outputs are shown at 0-15 and Window 0 means that there is an opportunity for the first cell in the data stream to be sent to central switch 0 and so on. Without the staggering of the windows through which cells can be transmitted across the switch it would be extremely difficult for the switch to function.

As already mentioned each cell has a multiplicity of potential routes available to it across the switch. However when the switch is actually handling a load some of the routes will inevitably be occupied by cells of data from other input stages. In order to be able to determine a route through the switch the control protocols of the switch enable three queries to be put to the central stage to try to route these cells across the latter. This can best be appreciated from the timing diagram of FIG. 5. The upper part of this figure shows the timing between the outer stage (RX) and the central stage and the lower part the timing between the central stage and the transmit stage (TX). As already mentioned the internal cell size of the ADT switch is 320 bits and this is also the size of the individual windows shown in FIG. 4. The 32 bits added to the initial 288 bit cell are used as follows in the determination of the cells route: The first 8 bits are labelled AD1 in FIG. 5 and represent the first requested address. The next 2 bits labelled AV are address validation bits. The next 8 bits (AD2) are for the second requested address and the subsequent 8 bits (AD3) for the third requested address. The remaining 6 bits of the extra 32 bit control capability are spare. FIG. 5 also shows that the first 20 of these 32 extra bits occur before the switches have to start sending to the central stage. It can thus be seen that the control function at the outer stage of the ADT switch can attempt to route three cells at a time to the central stage. The number of queries available can be varied in accordance with the internal protocols of the switch.

Thus in the embodiment being described the control function of the switch holds, for each of the switches in the output stage, the top three different cell addresses in a FIFO (First In, First Out) circuit 53. This circuit 53 operates under the control of a path finder and control circuit 54 which receives an address accepted signal from an outer stage of the ADT switch on a line 55. On the path finder and control circuit receiving confirmation that a selected address is available it causes the appropriate cell to be transmitted via a cell sender circuit 56 to the next of the 16 outputs of the outer stage switch for transmission to the DMR circuit connected to that output.

The outer stage 30 has 16 cell receiver circuits 60 corresponding to the 16 cell sender circuits of the input stage 10. A circuit 61 extracts and checks the addresses of the received cells and controls the transmission of the received cells from a FIFO store 62 into which they have been fed by the receiver circuits to a line transmission circuit 63 for onward transmission.

FIG. 6 of the drawings shows in a diagrammatic form a central stage switch. The switch is generally shown at 100 with one of the 16 input DMR stages connected to it at 101 and one of the 16 output DMR stages to which it is connected shown at 102. The central stage switch 100 has 16 receiver stages of which one is shown at 103. It also includes a circuit 104 which determines whether or not there is space for each cell as it is received at a receiver. The received cells are stored in a cell store 105 with a capacity of 16 cells, one cell for each of the output DMR stages to which the central switch is connected. Cells stored in the cell store 105 are released under the control of the circuit 104 to the appropriate ones of 16 sender stages for transmission to the DMR stages connected to that particular central stage switch.

The degree of complexity in the device of cells to route can be increased considerably over the example given. However in practise this may not give corresponding improvements in operation.

It will be appreciated that the operation of the ATD switch as described means that there is a fixed delay in the switching of a cell between any input switch and any output switch even though each cell has a potential of 256 routes across the entire switch. These routes are only available in a timed sequence and once a free central switch has been located by the queries already described, then the passage time of the cell across the switch will be constant.

In determining the operation of the ATD switch just described the question of priority is important.

There can be two interpretations of priority, namely priority in access across the network and priority against cell discarding. These two objectives will now be considered separately.

a) Priority of access, this is equivalent to queue jumping at the input and output FIFO circuits 53 and 62. Due to the small size it is probably not worth doing at the input stage.

b) Priority against discarding. This is simply done by discarding lower priority cells first.

Broadcast is a very complex issue with respect to ATD paths. Some ATD switches can not broadcast at all. In general it is believed that there is very little if any need for broadcast for ordinary telephony applications. This design of switch can do a limited broadcast by sending the cells from the input stage separately to more than one destination.

In the embodiment described the only parts of the switch that needs to be externally controlled is the outer stage containing the input ports. This has to translate the incoming virtual circuit identities contained in the cell headers to the outgoing virtual circuit identity and port number. The port number is then used to self route the cell across the entire ATD switch to the output side. This greatly simplifies the external control function required. The control required consists of the establishment and maintenance of a header translation table to map the incoming cell information to the outgoing cell information and its address. This can be carried out with a conventional processor.

As the ATD switch operates synchronously, it is practical to duplicate it and let the outgoing line side check for errors between the two planes. There is spare bandwidth between the central stage and the output stage, this can be used to send to the output stage the address of the input stage that the cell was received from and this may be used to perform a reverse translation and so check that the cell is expected from that source.

Failed central switches may be masked out by suitable control of the outer switches to mask out the inputs from the central switch to never say address valid.

With synchronous operation between two planes of the switch, simple error checking can be performed, but there are problems with bringing a system back into synchronisation due to the way in which the system is not deterministic. However having looked at the way in which it handles traffic, it would appear that unless the system is very highly loaded, it should synchronise itself without any outside intervention, if it is given long enough. The larger the traffic load the longer it will take. This may be several thousand cells, but in practise the time this takes will be just a few seconds.

The main reason for this will be queue delay at the output side of the switch. It is always possible for the system to be overloaded. This overload is likely to be too many cells for a given output port. A suitable discarding algorithm is to not add to the output FIFO any cell that can not be added to it. The reason for this is that a cell that cannot fit in is likely to have waited a long time at the input side, and is going to have a long wait at the output side, and hence will suffer from a long delay.

At the input side it is possible for the FIFO's 53 to get overloaded, but less likely, there is not a clear cut case for throwing away any of the cells, but given the simplicity, it is suggested that the cell at the head of the queue is discarded. This will tend to discard cells which are destined for congested output ports and give new cells which do not have output congestion an opportunity of being switched. Modelling has shown that the size of this queue never gets very large, (the maximum size reached under randon traffic at 100% load was only 5). Therefore a slightly longer queue can be used, and the simple case can be used.

There are a number of ways in which larger switches can be made, for example by making the switching element bigger and faster, or using multiple stage switches.

The 256 port switch just described can be expanded in three main ways:

a) Running the system at a multiple of the data rate, and having two ports per outer stage. This can be achieved by having as many pins at the current data rate.

b) Having twice as many connections to each outer stage, and having two ports per outer stage and twice as many central stages.

c) Using a longer multiframe cycle, to have more switches per stage.

A combination of them is possible giving rise to a high degree of freedom in performance and size tradeoffs.

The basic switch, can be used in a multistage architecture. A two stage switch of 20 of the ATD switches as described hereinbefore would be sufficient for a 2000 port system, provided that the traffic is not too imbalanced. A three stage switch could provide a 32,000 port switch. To maintain cell sequence integrity variable routing could not be used between the stages. To reduce delay jitter due to blocking there will have to be a greater provision of capacity between stages than on the input to the switch.

The embodiment described has a number of advantages:

Firstly the design of the ATD switch is synchronous, thus permitting two planes to be run in dual synchronous made to check for failures. The switch switches data at a lower rate than that it receives by spreading the data out over many central stages.

Control is only needed at the received part of the switch, the cells are then self routing, with multiple central routes. The ATD switch is thus self routing.

Furthermore the switch has both variable cell routing and cell sequence integrity. This is a very unusual combination, but is highly desirable.

The ATD switch does not require very high technology to make it work, it being capable of being made with today's technology.

Another advantage is that in the ATD switch described the delay on cells is built from three elements, a FIXED delay depending on the port numbers (0 to 256 μs), a pure ATD output contention delay (0 to 105 μs, all ATD switches have this), and a very small input delay (0 to 10 μs). Most switches have many stages each exhibiting the ATD output contention delay.

Finally the switch is potentially capable of switching non ATD, synchronous traffic. Mixed mode of operation is possible.

Figure 7:
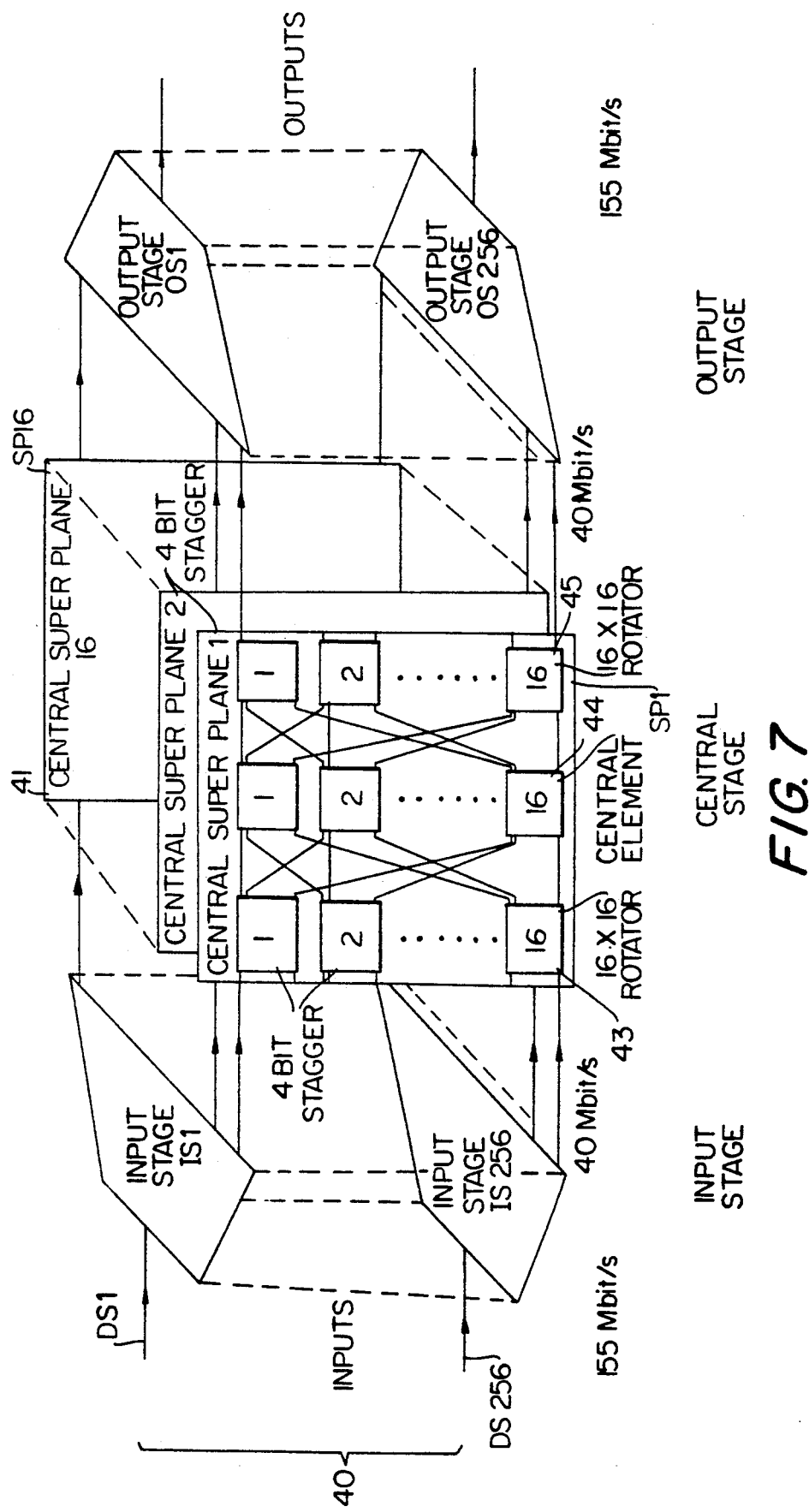
FIG. 7 is a detail view of the ATD switch of FIG. 1.

The embodiment shown in FIG. 7 is a more detailed view of ATD switch of the kind shown in FIG. 1.

In FIG. 7 the input data streams are shown at 40, and as already described, there are 256 streams of which two, DS1 and DS256, are shown. Each stream is supplied to an appropriate input stage IS1 to IS256. From these stages, the data streams are fanned out to a central stage 41. The central stage comprises 16 central super places SP1 . . . SP16, of which three are shown. All the central stage super places operate in the same fashion.

As can be seen from FIG. 7, each input stages IS1 . . . IS256 is connected to each of the central super planes SP1 . . . SP16 so that each super plane itself receives 256 inputs. These inputs are distributed over a first array of 16-by-16 rotator or DMR circuit 43, each DMR circuit being connected to one of 16 central elements 44. The central elements 44, in turn, each give one output to an individual one of 16 output or DMR circuits 45. The output DMR circuits 44 each give one of their 16 inputs to one of 256 output stages OS1 . . . OS256. As can be seen from FIG. 7, the incoming and outgoing data streams are at 155 Mbit/s and the internal connections run at a logical rate of 40 Mbit/s.

We claim:

1. An asynchronous time division (ATD) switch for handling a plurality of asynchronous serial data streams having sequential data cells, the ATD switch comprising: an input stage including a plurality of input ports, each capable of receiving a data stream, an output stage including a plurality of output ports, each capable of transmitting a data stream, and a central stage providing a multiplicity of paths by means of which each data cell received at an input port of the input stage can reach a required output port of the output stage, the central stage including a plurality of central stage switches for synchronously switching between the input and output ports and means for providing a fixed delay for any of the possible paths by which a given received data cell can pass through the ATD switch, each of said input ports in operation receiving an individual one of said data streams and distributing the cells of that stream over N outputs, where N is an integer means being provided for timing the cells so that at each input port of the input stage the cells are staggered on output from the respective input port and on receipt at the central stage, each output of an input port being connected to an input demultiplex-mix-remultiplex (DMR) circuit, each input DMR circuit having N inputs, N outputs and operating cyclically over a cycle time, each output of each input DMR circuit being connected to one of said central stage switches in such a manner that each input port of the input stage has access to all central stage switches over a switch cycle period defined by the cycle time of the input DMR circuits, and each central stage switch having N output, each connected to an individual one of a set of output DMR circuits, each output DMR circuit having N inputs and N outputs, each output DMR circuit having one of its N outputs connected to an output port of the output stage, whereby the ADT switch has both viable cell routing and cell sequence integrity.

2. The switch as claimed in claim 1, wherein the data streams received at the input stage and transmitted from the output stage travel at a predetermined data rate, and wherein the data stream passing along the paths through the ATD switch travel at a switching rate slower than said predetermined data rate.

3. The switch as claimed in claim 1, wherein the data streams are received at the input stage at a predetermined data rate, and are spread over a plurality of central stages to switch the data streams at a switching rate lower than said predetermined data rate.

4. The switch as claimed in claim 1, wherein the input stage includes control means for self-routing the data streams received at the input stage.

5. The switch as claimed in claim 1; and further comprising control means including a first-in, first-out circuit for holding a range of different cell addresses to which a data cell can be transmitted.

6. The switch as claimed in claim 5, wherein the control means includes a path finder circuit for controlling said first-in, first-out circuit, for confirming that a selected cell address is available, and for causing the appropriate data cell to be transmitted via a cell sender circuit.

7. The switch as claimed in claim 5, wherein the fixed delay is constant for a particular path, but is different for different paths.

* * * * *